United States Patent [19]

Stencel

[11] Patent Number: 5,435,678
[45] Date of Patent: Jul. 25, 1995

[54] INSERT ASSEMBLY FOR CONNECTING FASTENERS TO LIGHTWEIGHT MATERIALS

[75] Inventor: Edgar L. Stencel, Alta Loma, Calif.

[73] Assignee: Monogram Aerospace Fasteners, Inc., Los Angeles, Calif.

[21] Appl. No.: 54,550

[22] Filed: Apr. 27, 1993

[51] Int. Cl.6 ............................................. F16B 37/12
[52] U.S. Cl. .................................... 411/178; 411/109; 411/271; 411/325
[58] Field of Search ................. 411/44, 109, 176, 178, 411/182, 183, 271, 325, 432, 433

[56] References Cited

U.S. PATENT DOCUMENTS

| | | | |
|---|---|---|---|
| 2,577,810 | 12/1951 | Rosan | 411/109 |
| 2,639,179 | 5/1953 | Phelps | 411/178 |
| 2,754,882 | 7/1956 | Rosan . | |
| 3,007,364 | 11/1961 | Dickie . | |
| 3,103,962 | 9/1963 | Neuschotz . | |
| 3,163,197 | 12/1964 | Rosan et al. . | |
| 3,259,162 | 7/1966 | Rosan | 411/109 |
| 3,523,482 | 8/1970 | Ploch et al. . | |
| 3,837,522 | 9/1974 | Leshansky | 411/271 |
| 3,871,429 | 3/1975 | Bosse . | |
| 4,376,604 | 3/1983 | Pratt et al. . | |
| 4,439,078 | 3/1984 | Dessouroux . | |
| 4,568,228 | 2/1986 | Rosan, Jr. . | |
| 5,052,870 | 10/1991 | Pratt et al. . | |
| 5,137,408 | 8/1992 | Junkers | 411/433 |

*Primary Examiner*—Flemming Saether
*Attorney, Agent, or Firm*—Pretty, Schroeder, Brueggemann & Clark

[57] ABSTRACT

An insert assembly for installation in a workpiece having a threaded hole. When the inner insert is axially received within the outer insert, the mating surfaces of these members are configured such that the inner insert applies a radial outward force to the outer insert to securely install the insert assembly in the workpiece. A stud assembly also is provided for installation in the workpiece hole. The stud assembly comprises a stud body and a stud. When the stud is axially received within the stud body, the mating surfaces of these members, like the insert assembly, are configured such that the stud applies a radial outward force to the stud body to securely install the stud assembly in the workpiece. Both the insert assembly and stud assembly are particularly adapted for use with workpieces made of relatively soft or lightweight materials.

12 Claims, 5 Drawing Sheets

INSERT ASSEMBLY FOR CONNECTING FASTENERS TO LIGHTWEIGHT MATERIALS

BACKGROUND OF THE INVENTION

The present invention relates to threaded inserts for connecting fastening devices to workpieces and, more particularly, to a threaded insert for connecting studs and bolts to relatively soft or lightweight materials.

Studs and bolts are commonly installed in workpieces and the like for use in connecting panels, equipment and various other components to the workpiece. When the workpiece is made of steel or similar high strength materials, the workpiece usually is prepared to receive the bolt by drilling a hole in the workpiece and then tapping the hole to provide female threads to receive the male threads of the bolt. In most instances, the female threads formed in the workpiece are strong enough, due to the hardness of the steel material, to retain the bolt without stripping or otherwise damaging the workpiece. However, when the bolt must be installed in a workpiece made of a relatively soft or lightweight material, such as aluminum castings or composite materials, then the hole in the workpiece designed to receive the bolt must be specially prepared.

When using relatively soft or lightweight materials, the workpiece hole is drilled and tapped, similar to the drill and tap procedure used with workpieces made of steel materials. If the workpiece hole is tapped in the usual manner with threads that match the bolt threads, however, then a straight connection between the bolt and workpiece is weak and prone to failure, because the soft nature of the workpiece material and resulting threads usually are not strong enough to hold the bolt under typical operating loads. Hence, the workpiece threads are susceptible to stripping, resulting in a failed connection and oftentimes damage to the workpiece.

To solve the foregoing problems, it is common to use a threaded insert installed in the workpiece hole to receive the bolt. These inserts usually comprise a multi-piece insert assembly having an inner and outer thread with a retaining device. The outer insert has external threads for connection to the threaded hole in the workpiece. It also has internal threads for connection to external threads on the mating bolt or stud. The external threads on the outer insert usually are larger than the bolt threads to provide a more secure connection to the workpiece. In addition, the threaded insert frequently is swaged into the workpiece hole to create an even more secure connection, or a lock ring is used with tangs or serrations designed to broach into the workpiece to prevent rotation of the insert assembly.

During installation of multi-piece insert assemblies of the type described above, problems have been encountered in several areas. For example, some insert assemblies require multiple steps in which the insert is first threaded to the workpiece hole in one step and then the locking device is subsequently pressed or struck to retain the insert in another step. These multiple swaging operations can be time consuming and increase labor costs. Another area of concern involves damage to the workpiece during installation of the insert assemblies. When broaching is involved, oftentimes a striking or other force is applied to broach the material to attach the insert to the material of the workpiece. These forces can cause damage to the workpiece requiring replacement and increased costs. These forces also can remove protective coatings or finishes on the workpieces and allow corrosion to occult.

Accordingly, there has existed a need for an insert assembly that can securely attach a bolt or stud to a workpiece made from a soft or lightweight material, which is relatively simple and quick to install, and which does not cause damage or other harmful effects to the workpiece during the installation process. The present invention satisfies these needs and provides further related advantages.

SUMMARY OF THE INVENTION

The present invention provides an insert assembly for installation in a workpiece having a threaded hole. The insert assembly comprises an outer insert and an inner insert received axially within the outer insert. The outer insert has external threads for engagement with the threads in the workpiece hole, and the inner insert has an inner surface defining a bore which may be threaded for receiving, for example, a fastener. When the inner insert is axially received within the outer insert, the mating surfaces of these members are configured such that the inner insert applies a radial outward force to the outer insert to securely install the insert assembly in the workpiece. This is done quickly and conveniently in a single installation step.

More particularly, in one embodiment of the invention, the outer insert has an inner surface comprising an inner section and an outer section, with the diameter of the inner section being less than the diameter of the outer section. The inner insert has an outer surface adapted to engage the inner surface of the outer insert, which comprises an inner section, a middle section and an outer section. The inner section of the inner insert has a diameter greater than the diameter of the inner section of the outer insert. This limits the axial outward travel of the inner insert with respect to the outer insert. The middle section of the inner insert has a diameter substantially equal to the diameter of the inner section of the outer insert. Finally, the outer section of the inner insert has a diameter substantially equal to the diameter of the outer section of the outer insert.

In accordance with the invention, a protrusion is arranged on the middle section of the inner insert which is adapted, when the inner insert is moved axially outward into the outer insert, to apply a radial outward force to the outer section of the outer insert. In one form of the invention, there are a plurality of protrusions in the form of axially extending ribs. In another form of the invention, the protrusions are arranged to form an axially serrated surface. Thus, during installation of the insert assembly in the workpiece hole, the protrusions on the inner insert apply a radial outward swaging force to the outer insert which securely installs the insert assembly in the workpiece hole.

In one aspect of the invention, the outer section of the inner insert is adapted to be deformed radially outward into a counterbore in the outer section of the outer insert. In still another aspect of the invention, the outer end of the outer insert is adapted to be swaged into another counterbore, in the workpiece hole, at the same time the deformable outer section on the inner insert is deformed radially outward into the counterbore of the outer insert.

In still other aspects of the invention, the transition between the inner and middle sections of the inner insert forms a shoulder that engages the inner end of the outer insert when the inner insert is fully received within the outer insert. There is a further shoulder at the transition between the middle and outer sections of the inner insert that engages another shoulder at the transition between the inner and outer sections of the outer insert. These shoulders engage each other to limit the axially outward movement of the inner insert with respect to the outer insert and provide a secure connection between these two members.

In another embodiment of the invention, a stud assembly is provided for installation in the workpiece. The stud assembly comprises a stud body received within the workpiece hole, and a stud that is axially received within the stud body. Similar to the first embodiment of the invention described above, the outer surface of the stud and the inner surface of the stud body each have surfaces which engage each other and cooperate to apply a radial outward force to the stud body and securely install the stud assembly in the workpiece.

The insert assembly and stud assembly of the present invention can be conveniently installed in the workpiece hole in a single installation step. Thus, multiple swaging steps in which the outer insert is first swaged into the workpiece hole in one step, and then the inner insert is subsequently swaged to the outer insert in another step, are eliminated. As a result, time and labor costs are saved. In addition, installation of the insert assembly and stud assembly of the present invention does not require a striking or other force to be applied that could cause damage to the workpiece or remove protective coatings or finishes on the workpiece. As a result, harmful damage and corrosion to the workpiece is avoided.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
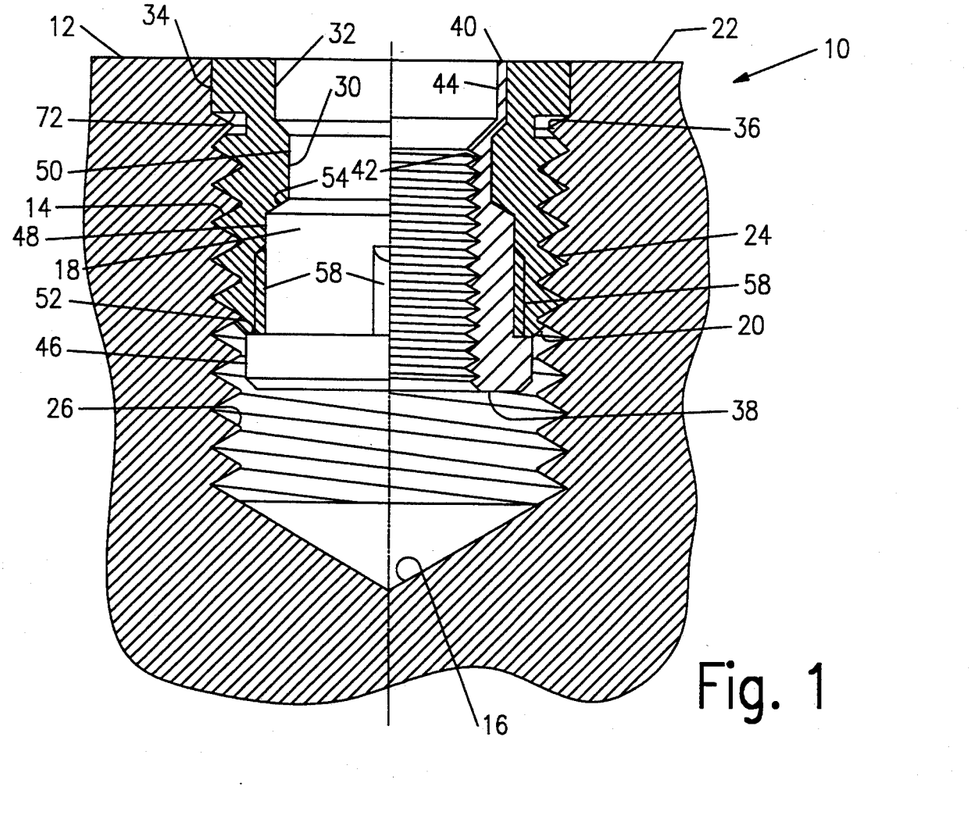
FIG. 1 is an elevational view, partly in cross-section, of a first embodiment of the invention comprising an insert assembly installed in a workpiece.

As shown in FIG. 1, the present invention is embodied in an insert assembly, generally referred to by the reference numeral 10, for installation in a workpiece 12. The insert assembly 10 comprises an outer insert 14 received within a hole 16 in the workpiece, and an inner insert 18 received axially within the outer insert. When the insert assembly 10 is fully installed in the workpiece 12, as shown in FIG. 1, it is designed to receive an externally threaded member (not shown), such as a fastener, bolt or the like.

Figure 2:
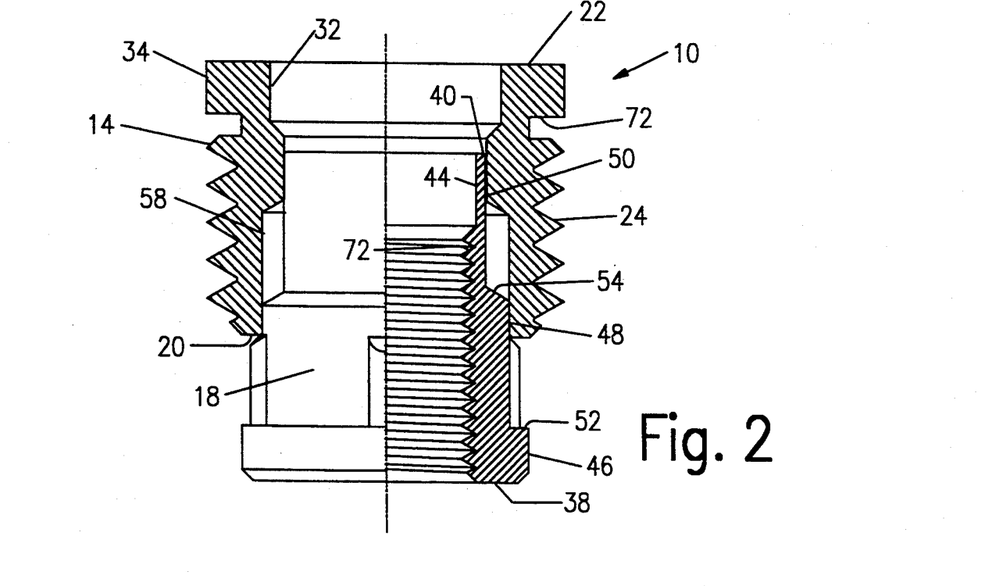
FIG. 2 is an elevational view, partly in cross-section, showing the insert assembly prior to installation in the workpiece.

FIG. 2 shows the insert assembly 10 in its preassembled condition prior to installation in the workpiece 12. In this pre-assembled condition, the inner insert 18 is positioned within but spaced outwardly from the outer insert 14. In the final assembled condition, shown in FIG. 1, the inner insert 18 is moved axially outward with respect to the outer insert 14 and then is swaged in a manner described in more detail below in connection with FIGS. 3–6.

Figure 3:
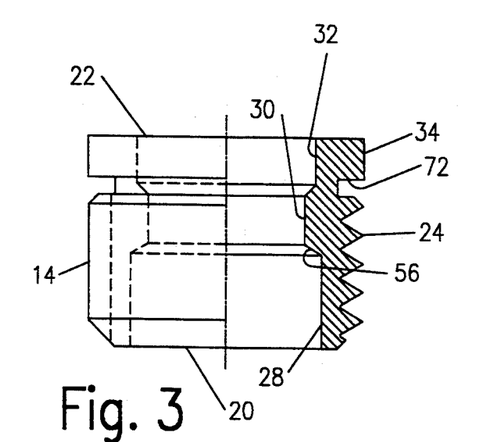
FIG. 3 is an elevational view, partly in cross-section, showing an outer insert of the insert assembly.

FIG. 3 shows the outer insert 14 in more detail. The outer insert 14 has an inner end 20 and an outer end 22. It also has a substantially cylindrical shape and comprises an outer surface having external threads 24 for engagement with matching threads 26 in the workpiece hole 16. The outer insert 14 further has an inner surface having two different sections of varying diameter. These two sections comprise an inner section 28 and an outer section 30. The inner section 28 has a diameter that is greater than the diameter of the outer section 30. The outer section 30 also has a counterbore 32. In one preferred form, the counterbore 32 has a diameter that is slightly less than the diameter of the inner section 28.

As noted above, the external threads 24 of the outer insert 14 engage the threads 26 in the workpiece hole 16 and serve to retain the outer insert within the workpiece 12. These threads 24 and 26 preferably are made larger than conventional bolt-type threads so that the outer insert 14 is held more securely within the workpiece hole 16. The outer end 22 of the outer insert 14 preferably also has an unthreaded portion 34 that is received within a counterbore 36 of the workpiece hole 16. This unthreaded portion 34 is designed to fit within the counterbore 36 and limit the depth of insertion of the outer insert 14 into the workpiece hole 16. The axial dimension of the counterbore 36 in the workpiece hole 16 and the axial length of the unthreaded portion 34 can be matched to provide a flush workpiece surface when the outer insert 14 is installed in the workpiece hole 16.

Figure 4:
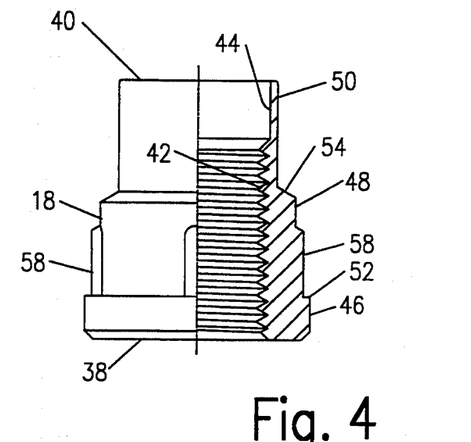
FIG. 4 is an elevational view, partly in cross-section, showing an inner insert for receipt within the outer insert of the insert assembly.
Figure 5:
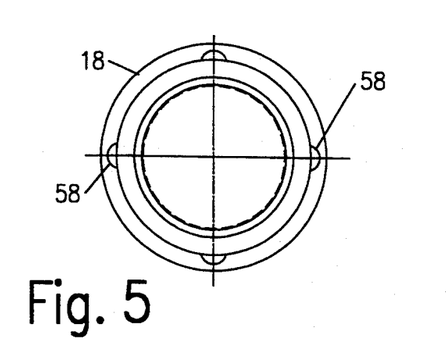
FIG. 5 is a plan view of the inner insert of FIG. 4.
Figure 6:
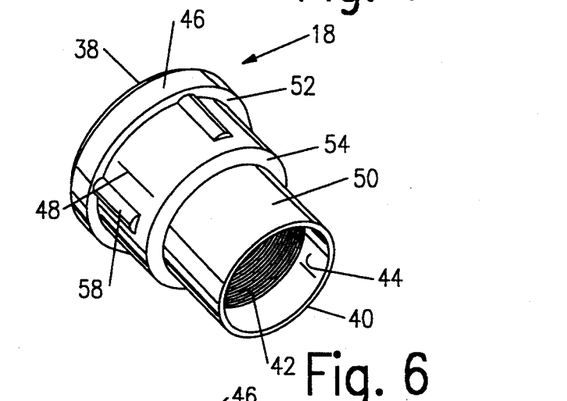
FIG. 6 is a perspective view of the inner insert of FIG. 4.

FIGS. 4–6 show one embodiment of the inner insert 18. It also has a substantially cylindrical shape having an inner end 38 and an outer end 40. A portion of the inner surface of the inner insert 18 has threads 42 for engaging the externally threaded member. Beyond these threads 42, at the outer end 40 of the inner insert 18, an unthreaded deformable section 44 is provided. The outer surface of the inner insert 18 has three main sections comprising an inner section 46, a middle section 48 and an outer section 50. The inner section 46 has a diameter that is greater than the diameter of the inner section 28 of the outer insert 14. The middle section 48 has a diameter that is substantially equal to the diameter of the inner section 28 of the outer insert 14. Finally, the outer section 50 has a diameter that is substantially equal to the diameter of the outer section 30 of the outer insert 14.

The inner insert 18 and outer insert 14 also have shoulders that engage each other and are designed to limit the axial outward movement of the inner insert with respect to the outer insert during installation. In particular, the transition between the inner section 46 and the middle section 48 of the inner insert 18 forms a first shoulder 52 that engages the inner end 20 of the outer insert 14 when the inner insert 18 is fully received within the outer insert 14. In addition, the transition between the middle section 48 and the outer section 50 of the inner insert 18 forms a second shoulder 54 that engages a third shoulder 56 at the transition between the inner and outer sections 28 and 30 of the outer insert 14 when the inner insert 18 is fully received within the outer insert 14.

The middle section 48 of the inner insert 18 is provided with a plurality of protrusions 58 forming, at that point, a diameter that is less than the diameter of the inner section 46 but greater than the diameter of the middle section 48 of the inner insert 18. In the embodiment of the inner insert 18 shown in FIGS. 4–6, these protrusions 58 comprise axially extending ribs. Preferably, there are four such ribs spaced equally around the circumference of the middle section 48 of the inner insert 18.

Figure 7:
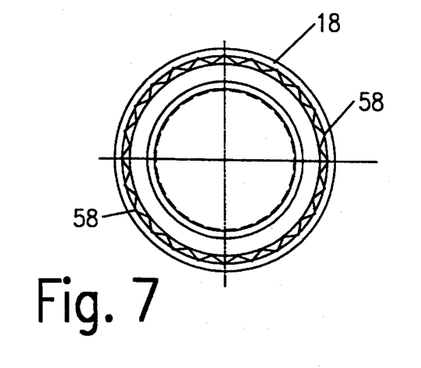
FIG. 7 is a plan view of an alternative embodiment of the inner insert.
Figure 8:
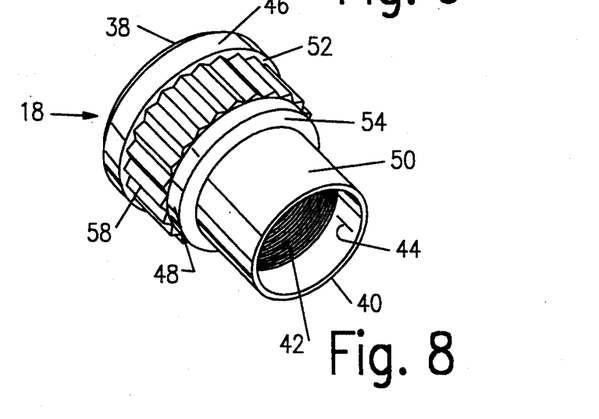
FIG. 8 is a perspective view of the inner insert of FIG. 7.

In another embodiment of the inner insert 18, shown in FIGS. 7–8, the protrusions 58 on the middle section 48 are in the form of a plurality of axially extending serrations. In the preferred form of this embodiment, a continuously serrated surface is provided around the circumference of the middle section 48 of the inner insert 18. Like the protrusions 58 of the embodiment shown in FIGS. 4–6, the diameter of the serrated surface is less than the diameter of the inner section 46 but greater than the diameter of the middle section 48 of the inner insert 18. Whether ribs or serrations are used, the axial length of them should be at least equal to the axial distance between two threads 26 of the workpiece hole 16.

The inner insert 18 preferably is constructed from materials that are harder than the materials used to construct the outer insert 14. For example, the inner insert 18 may be constructed from 304 stainless steel (cold worked), A-286 high temperature stainless steel (age hardened), 8740 alloy steel (heat treated to about 160–180 KSI) or 6AL-4V titanium (heat treated to about 160–180 KSI), and the outer insert 14 may be constructed from 2024-T6 aluminum alloy, 304 stainless steel (annealed), A-286 high temperature stainless steel (annealed), C-1117 carbon steel or B-1113 carbon steel. The insert assembly 10 of the present invention also is especially designed for use in workpieces 12 made of relatively soft or lightweight materials, such as aluminum castings or composite materials. However, it will be understood that the insert assembly 10 may be used with workpieces 12 made of harder materials as well.

Figure 9:
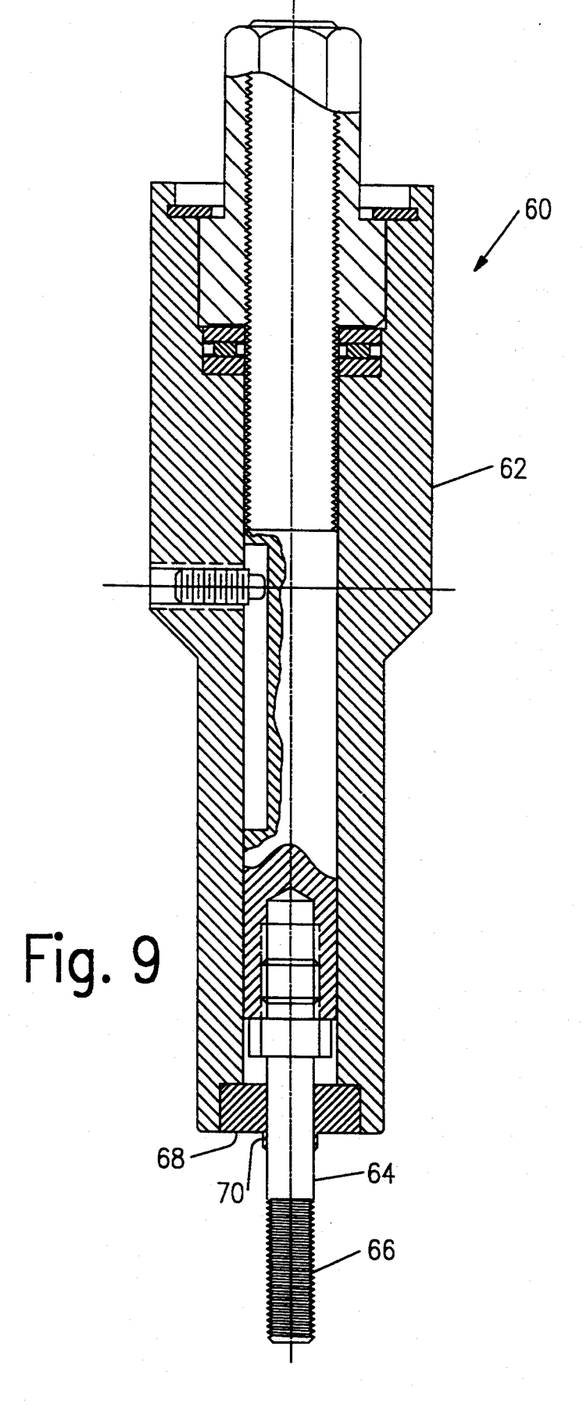
FIG. 9 is a cross-sectional elevational view of a swaging tool for use in installing the insert assembly in the workpiece.

FIG. 9 shows an installation tool 60 for installing the insert assembly 10 in the workpiece hole 16. The installation tool 60 comprises a stationary tool housing 62 having a rotatable mandrel 64 extending from one end of the tool. The outer end of the mandrel 64 has external threads 66 designed to match and engage the internal threads 42 on the inner insert 18. The installation tool 60 also has a swaging element 68 surrounding the mandrel 64. The swaging element 68 has a swaging nose 70 adapted to swage the insert assembly 10 into the workpiece hole 16. Installation tools 60 of the type described above are available from Monogram Aerospace Fasteners, Inc. of Los Angeles, Calif.

Installation of the insert assembly 10 in the workpiece hole 16 will now be described in conjunction with FIGS. 1, 2 and 9. First, the insert assembly 10 is put in a pre-assembled condition by inserting the inner insert 18 within the outer insert 14 as shown in FIG. 2. This pre-assembled condition usually is carried out by the manufacturer so that the end user does not have to bother with this step. A snap-fit type engagement between the mating surfaces of the outer and inner inserts 14 and 18 may be provided for this purpose. Next, the insert assembly 10 is placed axially over the mandrel 64 and rotated so that the threads 66 of the mandrel 64 engage the internal threads 42 of the inner insert 18. After this, the insert assembly 10 on the mandrel 64 is positioned within the workpiece hole 16 so the external threads 24 on the outer insert 14 will be threaded into engagement with the threads 26 in the workpiece hole 16. The installation tool 60 is then operated to rotate the mandrel 64, causing the insert assembly 10 to be threaded into the workpiece hole 16 until a shoulder 72 on the outer insert 14 engages the bottom of the counterbore 36 in the workpiece hole 16 to stop further advancement. With the mandrel 64 still rotating, the inner insert 18 is now drawn axially outwardly through the outer insert 14. During this movement, the protrusions 58 on the inner insert 18 exert a radially outward force on the inner section 28 of the outer insert 14. This radial outward force effectively swages the outer insert 14 against the parent material of the workpiece 12. Advancement of the inner insert 18 continues until the first and second shoulders 52 and 54 on the inner insert 18 engage the inner end 20 and the third shoulder 56, respectively, on the outer insert 14. Finally, the swaging nose 70 of the installation tool 60 advances and swages the deformable outer section 44 of the inner insert 18 into the counterbore 32 in the outer insert 14. This swaging action also causes material of the outer insert 14 to be swaged against the counterbore 36 in the workpiece hole 16. Hence, a secure connection between the insert assembly 10 and the workpiece 12 is achieved, in a quick and convenient one-step installation procedure.

Figures 10, 11, 12, 13, 14:
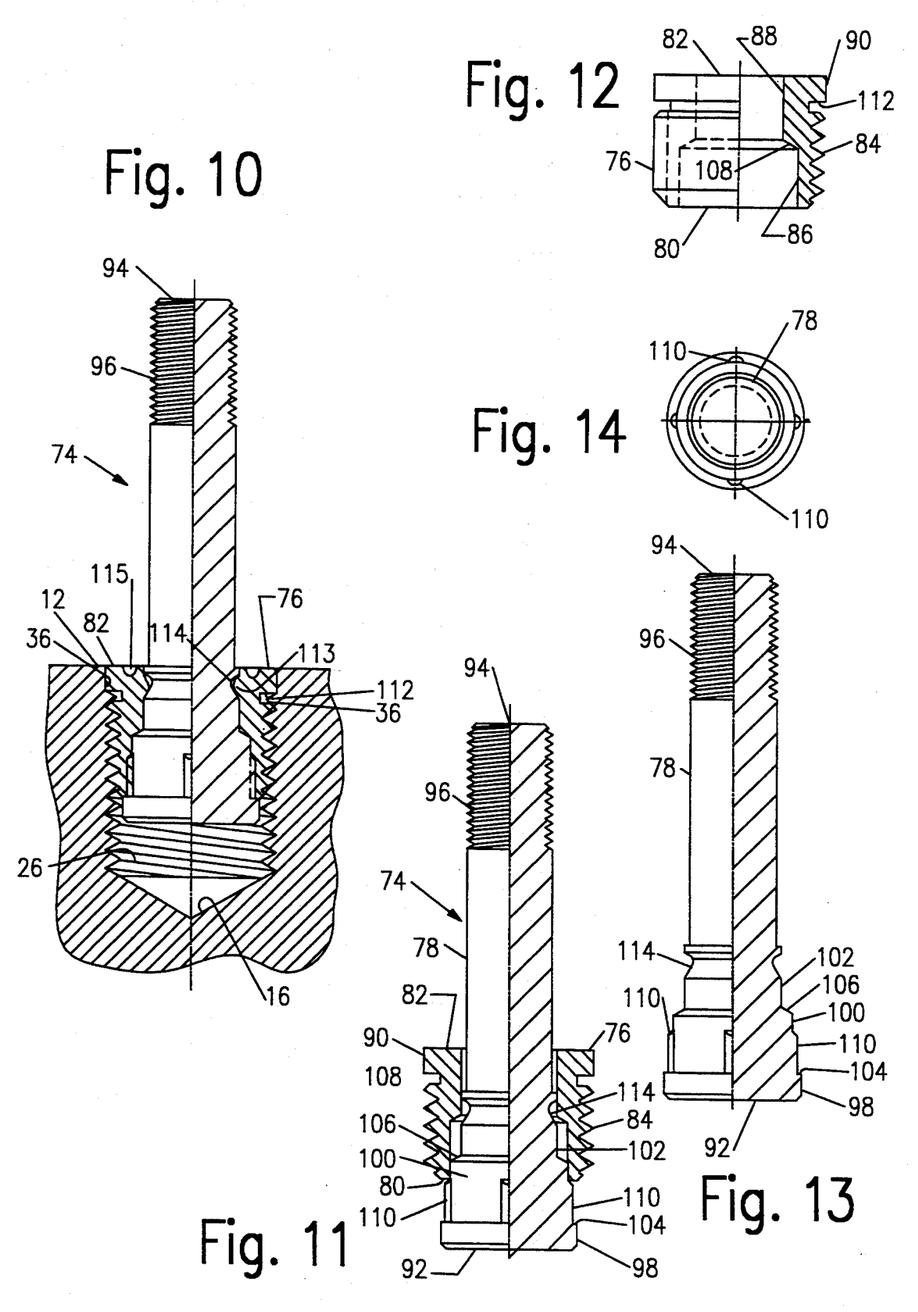
FIG. 10 is an elevational view, partly in cross-section, of a second embodiment of the invention comprising a stud assembly installed in a workpiece.
FIG. 11 is an elevational view, partly in cross-section, showing the stud assembly prior to installation in the workpiece.
FIG. 12 is an elevational view, partly in cross-section, showing a stud body of the stud assembly.
FIG. 13 is an elevational view, partly in cross-section, showing a stud for receipt within the stud body of the stud assembly.
FIG. 14 is a plan view of the stud of FIG. 13.

Another embodiment of the present invention, in the form of a stud assembly 74 for installation in the workpiece 12, is shown in FIGS. 10–14. The stud assembly 74 comprises a stud body 76 received within the workpiece hole 16, and a stud 78 received axially within the stud body 76. When the stud assembly 74 is fully installed in the workpiece 12, as shown in FIG. 10, it may be used to attach another workpiece, a panel, equipment or various other components (not shown) to the workpiece 12.

FIG. 11 shows the stud assembly 74 in its preassembled condition prior to installation in the workpiece 12. In this pre-assembled condition, the stud 78 is positioned within but spaced outwardly from the stud body 16. In a final assembled condition, shown in FIG. 10, the stud 78 is moved axially outward with respect to the stud body 76, and then a portion of the stud body is swaged in a manner described in more detail below in connection with FIGS. 12-13.

FIG. 12 shows the stud body 76 in more detail. The stud body 76 has an inner end 80 and an outer end 82. It also has a substantially cylindrical shape and comprises an outer surface having external threads 84 for engagement with matching threads 26 in the workpiece hole 16. These threads 26 and 84 preferably are made larger than conventional bolt-type threads so that the stud body 76 is held more securely within the workpiece 16. The stud body 76 further has an inner surface having two different sections of varying diameter. These two sections comprise an inner section 86 and an outer section 88. The inner section 86 has a diameter that is greater than the diameter of the outer section 88.

As noted above, the external threads 84 of the stud body 76 engage the threads 26 in the workpiece hole 16 and serve to retain the stud body 76 within the workpiece 12. The outer end 82 of the stud body 76 preferably also has an unthreaded portion 90 that is received within the counterbore 36 of the workpiece hole 16. This unthreaded portion 90 is designed to fit within the counterbore 36 and limit the depth of insertion of the stud body 76 into the workpiece hole 16. The axial dimension of the counterbore 36 in the workpiece hole 16 and the axial length of the unthreaded portion 90 can be matched to provide a flush workpiece surface when the stud body 76 is installed in the workpiece hole 16.

FIGS. 13-14 show the stud 78, which comprises a cylindrical shape having an inner end 92 and an outer end 94. The outer end 94 extends outwardly from the workpiece 12 and has a portion with external threads 96 for engaging an internally threaded member (not shown). The outer surface of the stud 78 received within the stud body 76 has three main sections comprising an inner section 98, a middle section 100 and an outer section 102. The inner section 98 has a diameter that is greater than the diameter of the inner section 86 of the stud body 76. The middle section 100 has a diameter that is substantially equal to the diameter of the inner section 86 of the stud body 76. Finally, the outer section 102 has a diameter that is substantially equal to the diameter of the outer section 88 of the stud body 76.

The stud body 76 and stud 78 also are provided with a plurality of shoulders that engage each other to limit axial outward movement of the stud 78 with respect to the stud body 76. In particular, the transition between the inner section 98 and the middle section 100 of the stud 78 forms a first shoulder 104 that engages the inner end 80 of the stud body 76 when the stud 78 is fully received within the stud body 76. In addition, the transition between the middle section 100 and the outer section 102 of the stud 78 forms a second shoulder 106 that engages a third shoulder 108 at the transition between the inner and outer sections 86 and 88 of the stud body 76 when the stud 78 is fully received within the stud body 76.

Like the insert assembly 10 described above, the middle section 100 of the stud 78 is provided with a plurality of protrusions 110 forming, at that point, a diameter that is less than the diameter of the inner section 98 but greater than the diameter of the middle section 100 of the stud 78. In the embodiment of the stud 78 shown in FIGS. 13-14, these protrusions 110 comprise axially extending ribs. Preferably, there are four such ribs spaced equally around the circumference of the middle section 100 of the stud.

Figure 15:
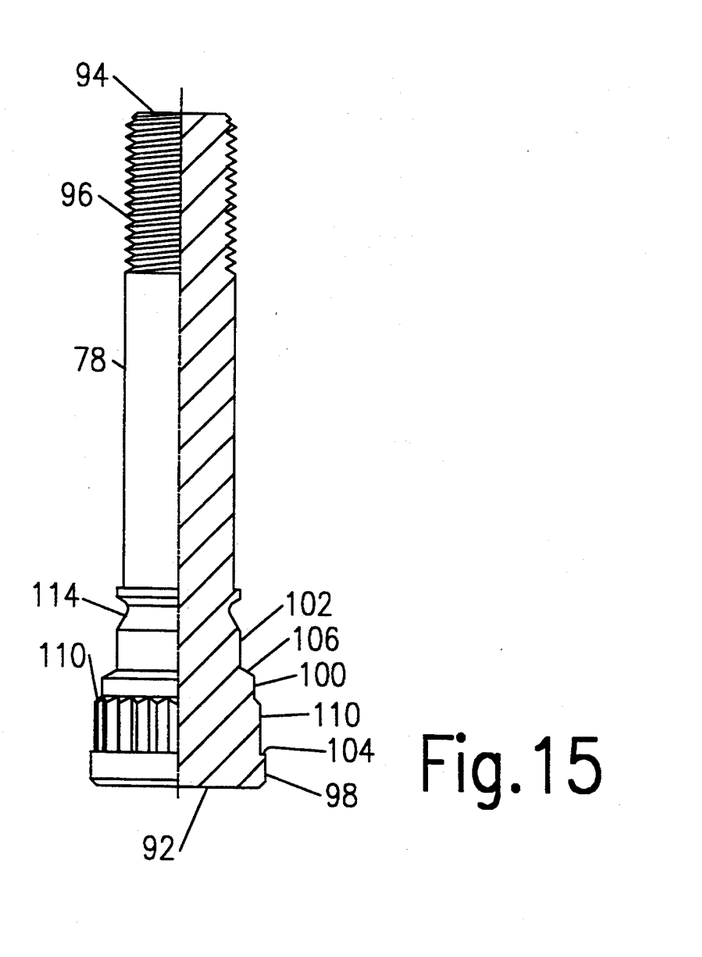
FIG. 15 is an elevational view, partly in cross-section, showing an alternative embodiment of the stud.
Figure 16:
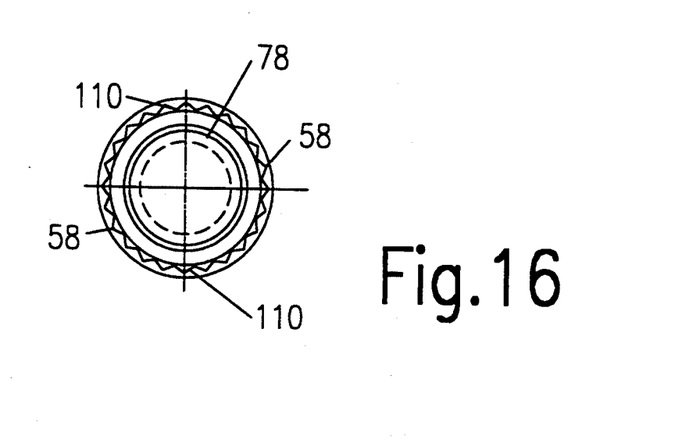
FIG. 16 is a plan view of the stud of FIG. 15.

In another embodiment of the stud 78, shown in FIGS. 15-16, the protrusions 110 on the middle section 100 are in the form of a plurality of axially extending serrations. In the preferred form of this embodiment, a continuously serrated surface is provided around the circumference of the middle section 100 of the stud 78. Like the protrusions 110 of the embodiment shown in FIGS. 13-14, the diameter of the serrated surface is less than the diameter of the inner section 98 but greater than the diameter of the middle section 100 of the stud 78. Whether ribs or serrations are used, the axial length of them should be at least equal to the axial distance between two threads 26 of the workpiece hole 16.

The stud 78 preferably is constructed from materials that are harder than the materials used to construct the stud body 76. For example, the stud 78 may be constructed from 304 stainless steel (cold worked), A-286 high temperature stainless steel (age hardened), 8740 alloy steel (heat treated to about 160-180 KSI) or 6AL-4V titanium (heat treated to about 160-180 KSI), and the stud body 76 may be constructed from 2024-T6 aluminum alloy, 304 stainless steel (annealed), A-286 high temperature stainless steel (annealed), C-1117 carbon steel or B-1113 carbon steel. The stud assembly 74 of the present invention also is especially designed for use in workpieces 12 made of relatively soft or lightweight materials, such as aluminum castings or composite materials. However, it will be understood that the stud assembly may be used with workpieces 12 of a harder material as well.

Figure 17:
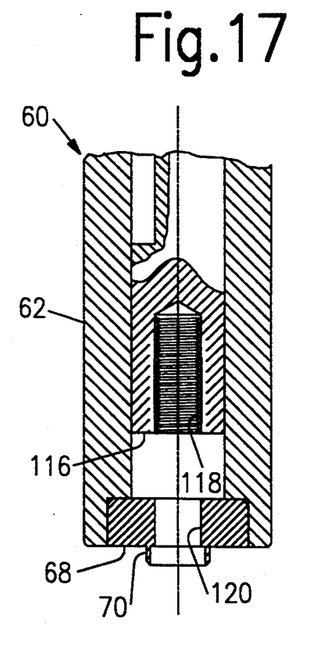
FIG. 17 is a cross-sectional elevational view of a swaging tool for use in installing the stud assembly in the workpiece.

FIG. 17 shows a portion of the installation tool 60 which has been modified to install and swage the stud assembly 74 in the workpiece hole 16. The installation tool 60 of FIG. 17 has the same stationary tool housing 62 and the same swaging element 68 and swaging nose 70 as the installation tool 60 shown in FIG. 9. However, instead of having a rotatable mandrel 64 with external threads 66 outside the tool housing 62 like the tool 60 of FIG. 9, the tool 60 of FIG. 17 has a rotatable sleeve 116 within the tool housing 62. This sleeve 116 has a bore with internal threads 118 designed to match and engage the external threads 96 on the stud 78. The swaging element 68 also has an unthreaded bore 120 to allow the stud 78 to pass into the threaded sleeve 116. Installation tools 60 of this type are available from Monogram Aerospace Fasteners, Inc. of Los Angeles, Calif.

The process for installing the stud assembly 74 in the workpiece hole 16 is similar to the process for installing the insert assembly 10 described above. First, the stud assembly 74 is put in a pre-assembled condition by inserting the stud 78 within the stud body 76, as shown in FIG. 11. This pre-assembled condition can be carried out by the manufacturer so that the end user does not have to bother with this step. Again, a snap-fit type engagement between the mating surfaces of the stud body 76 and stud 78 may be provided for this purpose. Next, the stud assembly 74 is placed axially into the tool 60 of FIG. 17 and rotated so that the internal threads 118 of the sleeve 116 engage the external threads 96 on the stud 78. After this, the stud assembly 74 is positioned within the workpiece hole 16 so the external threads 84 on the stud body 76 will be threaded into engagement with the threads 26 in the workpiece hole 16. The installation tool 60 is then operated to cause the stud body 76 to be threaded into the workpiece hole 16 until a shoulder 112 on the stud body 76 engages the bottom of the counterbore 36 in the workpiece hole 16 to stop further advancement. With the sleeve 118 still rotating, the stud 78 is then drawn axially outwardly through the stud body 76 causing the protrusions 110 on the stud 78 to exert a radial outward force on the inner section 86 of the stud body 76. This radial outward force effectively swages the stud body 76 against the parent material of the workpiece 12. Advancement of the stud 78 continues until the first and second shoulders 104 and 106 on the stud 78 engage the inner end 80 and the third shoulder 108, respectively, on the stud body 76. Finally, the swaging nose 70 of the installation tool 60 swages material 113 at the outer end 82 of the stud body 76 into a neck portion 114 of reduced diameter on the outer section 102 of the stud 78. This swaging action also causes material 115 of the stud body 76 to be swaged against the counterbore 36 in the workpiece hole 16. Hence, a secure connection between the stud assembly 74 and the workpiece 12 is achieved, in a quick and convenient one-step installation procedure.

While particular embodiments of the invention have been illustrated and described, it will be apparent that various modifications can be made by a person of ordinary skill without departing from the spirit and scope of the invention. Therefore, it is not intended that the invention be limited, except as by the appended claims.

I claim:

1. An insert assembly for installation in a workpiece having a threaded hole, comprising:
   (a) an outer insert having an inner end and an outer end, and having an outer surface with external threads for engagement with the threads in the workpiece hole, and having an inner surface comprising an inner section and an outer section, wherein the diameter of the inner section is greater than the diameter of the outer section;
   (b) an inner insert received axially within the outer insert, the inner insert having an inner surface defining a bore, and having an outer surface comprising,
      an inner section having a diameter greater than the diameter of the inner section of the outer insert,
      a middle section having a diameter substantially equal to the diameter of the inner section of the outer insert, such that the middle section of the inner insert is receivable within the inner section of the outer insert, and
      an outer section having a diameter substantially equal to the diameter of the outer section of the outer insert, such that the outer section of the inner insert is receivable within the outer section of the outer inset; and
   (c) a protrusion arranged on the middle section of the inner insert such that axial outward movement of the inner insert with respect to the outer insert applies a radial outward force to the outer section of the outer insert and thereby swages the outer insert within the workpiece hole.

2. The insert assembly of claim 1, further comprising a deformable outer section on the inner insert that is adapted to be deformed radially outward into a counterbore in the outer section of the outer insert.

3. The insert assembly of claim 1, wherein there are a plurality of protrusions on the middle section in the form of axially extending ribs.

4. The insert assembly of claim 3, wherein there are four ribs equally spaced from each other around the circumference of the middle section.

5. The insert assembly of claim 1, wherein there are a plurality of protrusions on the middle section in the form of axially extending serrations.

6. The insert assembly of claim 1, wherein the middle section of the inner insert and the protrusion are arranged to form an axially serrated surface.

7. The insert assembly of claim 1, wherein the transition between the inner section and the middle section of the inner insert forms a shoulder that engages the inner end of the outer insert when the inner insert is fully received within the outer insert.

8. The insert assembly of claim 1, wherein the transition between the middle section and the outer section of the inner insert forms a shoulder that engages another shoulder at the transition between the inner and outer sections on the outer insert when the inner insert is fully received within the outer insert.

9. The insert assembly of claim 2, wherein the outer surface of the outer insert at its outer end is unthreaded and forms a shoulder that is received within a counterbore in the workpiece hole to limit the depth of insertion of the outer insert into the workpiece hole.

10. The insert assembly of claim 9, wherein radial outward deformation of the outer section of the inner insert into the counterbore of the outer insert swages the outer end of the outer insert into the counterbore of the workpiece hole.

11. The insert assembly of claim 1, wherein the bore of the inner insert has threads for engagement with an externally threaded member.

12. The insert assembly of claim 2, wherein the portion of the bore in the inner insert, opposite the deformable outer section, is not threaded.

* * * * *